UNITED STATES PATENT OFFICE.

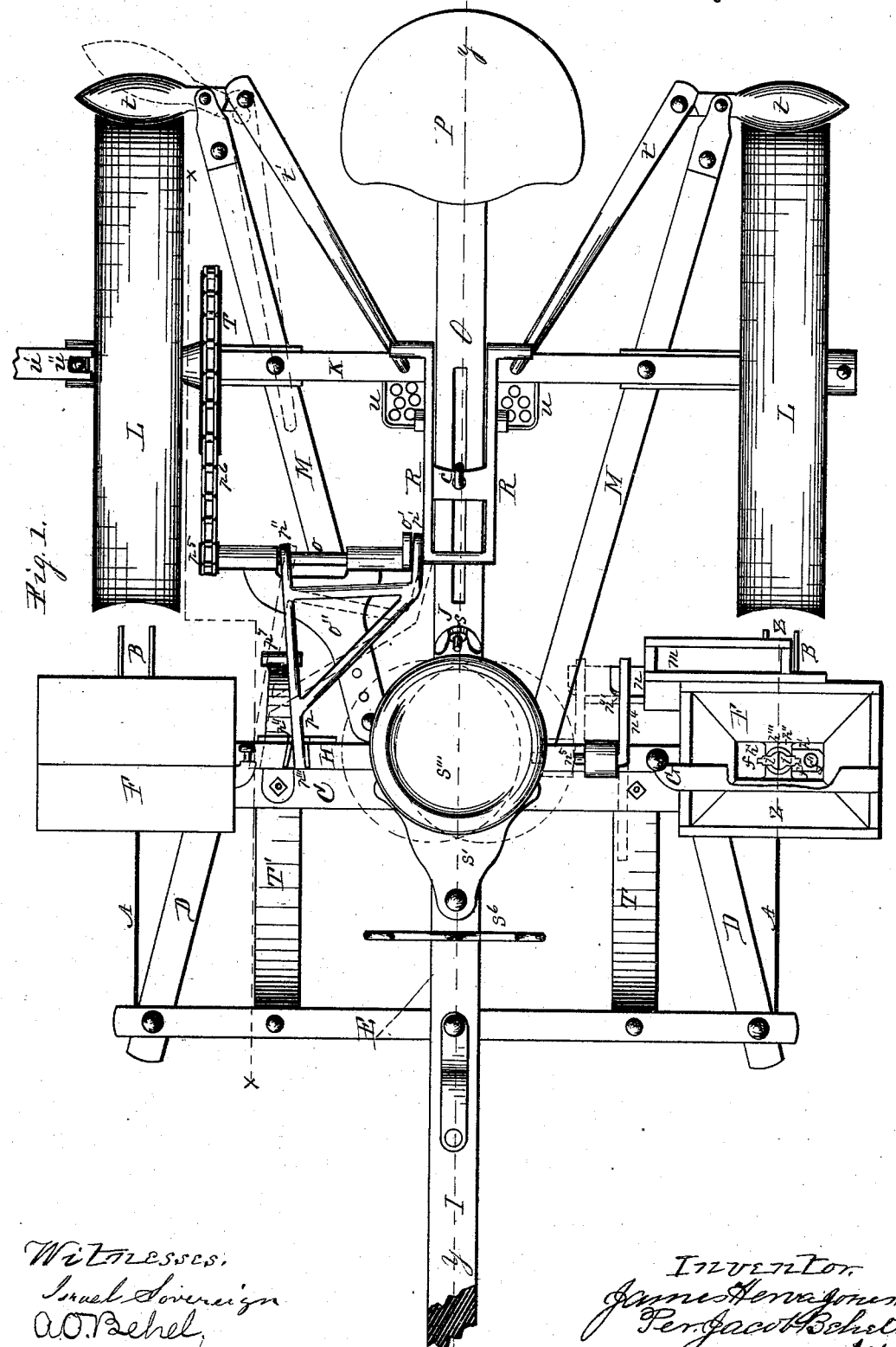

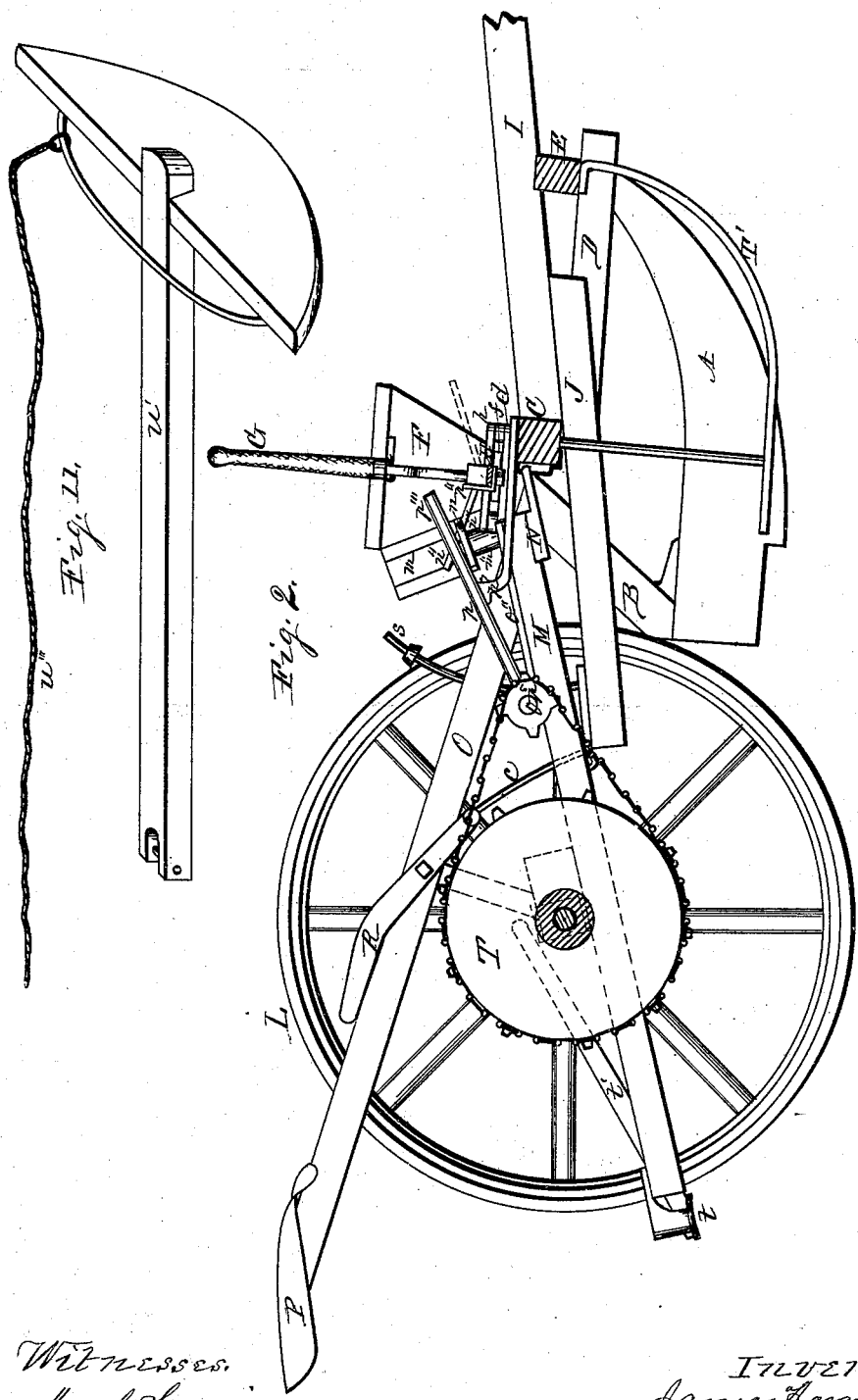

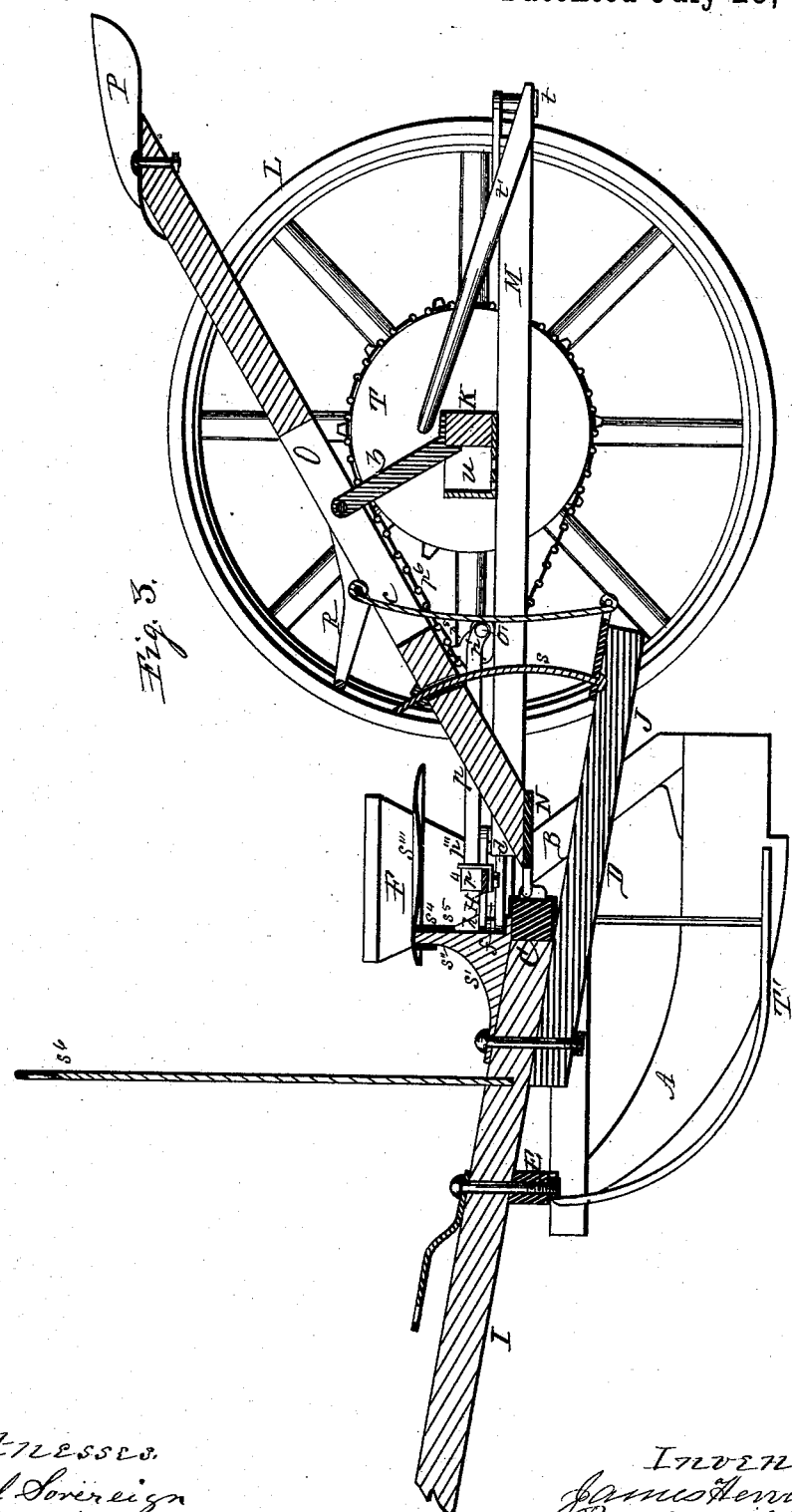

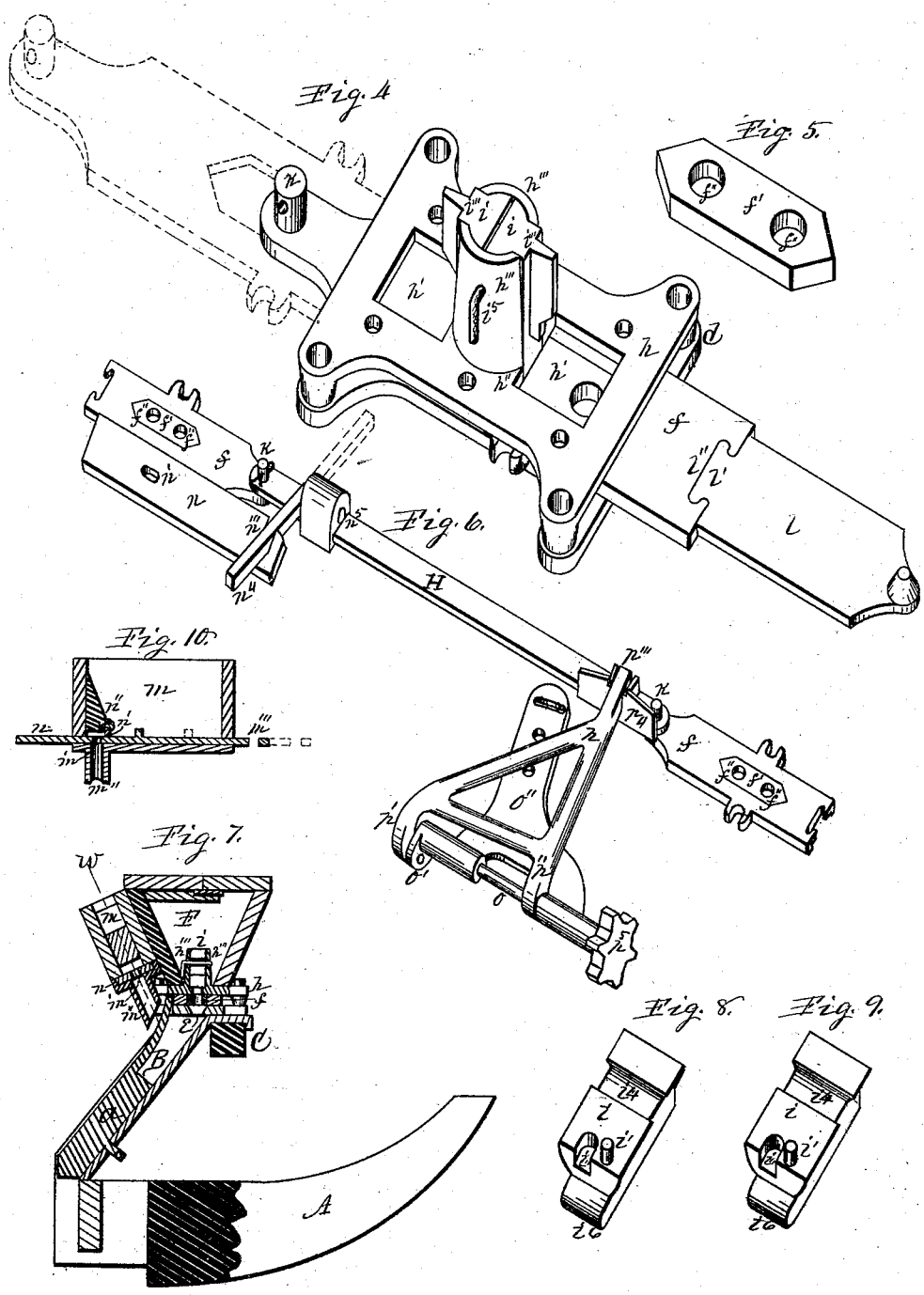

JAMES HERVA JONES, OF ROCKFORD, ILLINOIS, ASSIGNOR TO EMERSON, TALCOTT & CO., OF SAME PLACE.

CORN-PLANTING MACHINERY.

SPECIFICATION forming part of Letters Patent No. 261,724, dated July 25, 1882.

Application filed November 28, 1881. (Model.)

*To all whom it may concern:*

Be it known that I, JAMES HERVA JONES, a citizen of the United States, residing in the city of Rockford, in the county of Winnebago and State of Illinois, have invented new and useful Improvements in Corn-Planting Machines, of which the following is a specification.

My invention relates to that class of corn-planting machines in which a team is employed to draw the machine over the prepared ground to deposit the seed; and in this instance I produce a combined machine capable of use as a drill to deposit the seed in rows or as a check-row machine to deposit the seed in hills, and also to deposit pumpkin-seed or other like seeds at proper intervals in connection with the seeds deposited in drills or check-rows. To accomplish these purposes I have designed and constructed the machine represented in the accompanying drawings, in which—

Figure 1 is a plan view of a machine embodying my invention, of which Fig. 2 is a lengthwise vertical section on dotted line $x$. Fig. 3 is a central lengthwise vertical section on dotted line $y$. Fig. 4 is an isometrical representation of the seed-distributing mechanism of one of the seed-boxes. Fig. 5 is an isometrical representation of the removable seed-cells. Fig. 6 is an isometrical representation of the seed-slides connected and their automatic moving mechanism. Fig. 7 is a vertical transverse section of the seeding mechanism on dotted line $z$. Figs. 8 and 9 are isometrical representations of the two-part gravity cut-off. Fig. 10 is a lengthwise central section of the supplemental seed-box on dotted line $w$, and Fig. 11 is an isometrical representation of a marker.

The several parts represented in the accompanying drawings, consisting of the runners A, the inclined seed-spouts B, connected with the open heel of the runners, the transverse beam C, connecting the upper portion of the seed-spouts, the oblique horizontal beams D, connected to the under side of the end portions of the transverse beams C and with the forward upturned ends of the runners, and the forward transverse beam, E, connected with the forward end portion of the oblique beams D immediately over the forward end of runners, are substantially the same, and are joined in the same manner, producing a runner-frame substantially the same as the frame shown and described in my application for a patent on a corn-planting machine now pending before the United States Patent Office, and which said application was filed therein on or about March 17, 1881; also, the main seed-boxes F, mounted over the upper open end of the seed-spouts, the flipper-valves $a$ in the seed-spouts connected with the seed-slides, and the hand-lever G, pivoted to the seed-boxes and connected with the connecting-bar H of the seed-slides, are substantially the same and employed in substantially the same manner and for the same purpose as like parts in my former application above cited.

The tongue consisting of the main portion I and the rear portion, J, fixed in position to the transverse beams C and E of the runner-frame, the axle-tree K and the carrying-wheels L, mounted to revolve thereon, the hounds M, fixed to the end portions of the axle-tree, the yoke N, connecting their forward ends and having a flexible hinged connection with the runner-frame, the inclined seat-support, connected at its forward end to the yoke N and having a bracket-support, $b$, to connect it with the axle-tree, and a seat, P, fixed on its rear end, the lifting and supporting lever R, and the rod $c$, connecting it with the rear end of the tongue-extension, are in every particular constructed, arranged, and operated substantially as and for the purpose of like parts shown and described in my application for Letters Patent for improvements in corn-planting machines now pending before the United States Patent Office, and which said application was filed therein on or about June 19, 1881.

In the machine forming the subject-matter of this application, $d$ represents a metallic bed-plate of the seed-distributing mechanism, which is provided with a central opening, $e$. This bed-plate is fixed to the upper portion of the inclined seed-spout in a horizontal position, having its central opening directly over the opening in the spout.

At $f$ is represented a seed-distributing slide fitted to slide back and forth endwise on the bed-plate, guided in its movements by suitable ribbed, grooved, or stud guideways. These slides are provided with a lengthwise central opening adapted to receive the plate $f'$ freely and in such a manner as to be readily removed therefrom. These removable plates $f'$ are fitted with seed-cells $f''$, which in the movements of the slide are carried over the central opening in the bed-plate. A series of these removable plates are provided, in which the seed-cells vary in size and operate to vary the quantity of seed deposited, as a plate having larger or smaller cells is employed.

At $h$ is represented the metallic bottom of the seed-box, to which the side and end walls of the box are fixed. This bottom, with the box fixed thereto, is fixed to the bed-plate $d$ by means of suitable screw-bolts connecting their corner portions and in such a manner as to receive the seed-slide between them in position to slide endwise freely. These metallic bottoms toward their end portions are provided with openings $h'$, which admit the seed contained in the seed-box to the seed-distributing slide.

The center portion, $h''$, of the metallic bottom extends over the edge portions of the seed-slide immediately opposite the central opening in the bed-plate. From the central portion of the adjacent edges of these overlapping parts rise semi-tubular portions $h'''$, having their vertical opposite edges separated, forming a vertical slot on its lengthwise opposite sides to correspond with the lengthwise slot in the central portion of its base.

At $i$ are represented semi-cylindrical like parts, each of which is provided with a like dowel-pin, $i'$, and a like recess, $i''$, adapted to receive the dowel-pins when the parts are placed together, and in such a manner as to permit a limited independent vertical movement of the parts when in place in the vertical tube portion rising from the center portion of the metallic bottom of the seed-box, in which they are capable of a free but limited vertical movement. These like semi-cylindrical parts are provided with like radial flange portions, $i'''$, adapted to freely enter the vertical slots in the vertical tubular portion. These like parts are also provided on their contiguous sides with transverse grooves, $i^4$, which, when the parts are in place in the tube, receive a pin, $i^5$, passed transversely through the tube, operating to hold the parts from accidental displacement, but in such a manner as to permit of a limited vertical movement of the parts in unison or independently. The lower end portions, $i^6$, of these like parts are of rounded form and come in contact with the seed-slides, and operate under the influence of gravity to cut off the seed from the seed-cells in their passage to deliver the seed contained therein to the seed-spouts.

In use the rounded end portions, $i^6$, of the like parts operate in the movement of the seed-slides to strike the surplus seed from the seed-cells; and in the event of a grain of seed being caught between the edge of the cell and the rounded end of the cut-off it will rise within its limits to prevent cutting the seed; but if from any cause this limit is insufficient, then both semi portions of the cut-off will rise within their limits to give relief.

The inner ends of the seed-slides are provided with an uprising stud, $k$, which receive the perforated ends of the bar H, employed to connect the seed-slides placed in the seed-boxes on opposite sides of the machine, to cause them to move in unison. The end portions of this connecting-bar are also provided with suitable holes to receive the lower end of the pivoted hand-lever G, as in my former application hereinbefore referred to.

At $l$ is represented a seed-supporting plate having one of its ends, as at $l'$, fitted in dove-tailed-tenon form, adapted to enter the dove-tailed mortise $l''$, formed in the outer end portion of the seed-slides in such a manner as to be drawn into the seed-box with the withdrawal of the slide. With this construction of the parts the seed-cell plates are readily changed without removing the seed from the box, which is accomplished by disconnecting the slides from the connecting-rod and having the supporting-plate connected with the slide, which is then withdrawn, in which movement the supporting-plate will be carried into the seed-box to support the seed therein contained. When the seed-cell plate is withdrawn from the box with the slide it may be removed therefrom and another inserted in its place, when the slide may be returned to its position in the box, the supporting-plate removed, and the connection of the slide made with the connecting-bar.

At $m$ is represented a supplemental seed-box, designed to contain pumpkin-seed or other seeds to be deposited with the seed from the main seed-box at proper intervals. This supplemental seed-box in this instance is fixed to the rear side of the main seed-boxes, and its bottom is fitted with an outlet-opening, $m'$, and a tube, $m''$, through which the seed drops and is conducted to the seed-spout B, to be deposited with the seed from the main seed-box by the movement of the flipper-valve.

At $n$ is represented a seed-distributing slide fitted to move endwise in the supplemental seed-box, and provided with a seed-cell, $n'$, to receive the seed, and in its movements to carry it under the cut-off $n''$ and over the outlet-opening to permit the seed to drop from the seed-cell through the opening to the seed-spout. The inner end portion of this seed-slide is provided with a notch, $n'''$, for the purpose of connecting it with the movements of the main seed-slides.

An additional supplemental box substantially similar to the supplemental seed-box $m$ may be added in rear of the box $m$ and fitted in any of the known forms with any suitable apparatus to fit it for the distribution of a fertilizer to be deposited in the same operation with the distribution of the seed; or the supplemental box $m$ shown and described may be made detachable, and a suitable box from which to distribute fertilizers may be substituted, and such boxes may be made readily interchangeable and capable of use alternately to meet the requirements of the user.

At $n^4$ is represented a right-angled lever having one of its arms, $n^5$, pivoted to the bar connecting the main seed-slides, and in such position that when its free arm is in the position of the solid lines it will engage the notch $n'''$ in the seed-slide of the supplemental seed-box to cause it to move in unison with the main seed-slides, and when turned upon its pivotal connection to the position of the dotted lines it will be disengaged therefrom.

It will be observed that in this instance I have employed but one supplemental seed-box, and the seed-slide therein contained is provided with but one seed-receptacle, by which arrangement the seed from the supplemental seed-box will be deposited only in alternate hills in alternate rows; but by the employment of two supplemental seed-boxes, one on each side of the machine, and providing the seed-slides employed therein with two seed-cells to discharge their contents into the seed-spouts at every throw of the slides, the machine may be made to deposit the seed from the supplemental seed-boxes in every hill in every row.

At $o$ is represented a crank-shaft, one end of which is fitted with a crank, $o'$. This crank-shaft is mounted to revolve in suitable bearings in the rear portion of a bracket-bearing, $o''$, fixed on the forward end of one of the hounds.

At $p$ is represented a right-angled triangular lever, having the end portion of its rear arm, $p'$, connected with the wrist-pin of the crank-arm $o'$ and the rear end of the arm $p''$ connected with the crank-shaft in such a manner that the revolutions of the crank-shaft will impart a lateral vibratory movement to the forward free end, $p'''$, of the angle-lever, which extends forward in a horizontal position, overlapping the bar H, employed to connect the main seed-slides.

At $p^4$ is represented a bracket fixed to the connecting-bar H, having its upper edge portion notched to receive the forward free end, $p'''$, of the angle-lever in such a manner that the vibratory movements of the lever will operate to impart a reciprocating movement to the seed-slides with which the bar is connected. The outer end portion of the crank-shaft is provided with a sprocket-wheel, $p^5$, fitted to carry a chain belt, $p^6$, the links of which receive the sprocket-teeth of the wheel.

At T is represented a sprocket-wheel mounted on the inner end portion of the hub of one of the carrying-wheels and in line with the sprocket-wheel on the crank-shaft. This sprocket-wheel also carries the chain belt $p^6$. Its sprocket-teeth receive the links of the chain belt. From this arrangement it will be seen that the forward movement of the machine will, by means of its chain belt and lever connection, impart a reciprocating movement to the seed-slides to deposit the seed at proper intervals.

At $p^7$ is represented a bracket fixed to the rear transverse bar of the runner-frame, from which it extends rearward under the angle-lever in such a manner that in the raising of the runner-frame its rear end portion will engage the angle-lever and lift it from its connection with the notched bracket $p^4$ and stop the distribution of the seed.

At T' are represented supporting-runners having a wide tread, and connected to the forward and rear transverse beams of the runner-frame inside of the opening-runners A. The under surfaces of these supporting-runners are placed in position on a plane a suitable distance above the under cutting-edge of the opening-runners A, and their rear ends are made vertically adjustable by means of their screw-rod connection with the rear transverse beam of the runner-frame for the purpose of varying the running depth of the opening-runners.

At $s$ is represented a curved screw-rod having its lower end connected with the rear extension of the tongue and its upper screw-threaded portion extending upward through the seat-support, above which it is fitted with a thumb-screw nut, by means of which, in connection with the supporting-runners, the running depth of the heel of the opening-runners may be regulated, which is accomplished by raising or lowering the thumb-screw nut to raise or lower the heel end of the opening-runners by varying the relative angle of the runner-frame with the rear or supporting frame and supporting the runner-frame on the forward or rear portion of the supporting-runners.

At $s'$ is represented a bracket having a triangular-formed base, placed in position on the rear transverse beam of the runner-frame, at the junction of the tongue therewith, in such position that its arms extend laterally on the transverse beam and lengthwise on the tongue, having the ends of its arms secured to the parts by means of sufficient screw-bolts, producing a brace to give firmness to the junction of the tongue and beam. From the rear center of this bracket rises a stud-journal, $s''$, supported by bracket-flanges extending outward on the arms of the base.

At $s'''$ is represented a seat, circular in plan, having a socket, $s^4$, depending from the forward portion of its under side, and of proper dimensions to receive the stud-journal $s''$ snugly. The rear portion of this socket, as at $s^5$, is of greater length than its forward side, and depends below the bracket-flanges of the stud-journal in such a manner as to permit of a limited lateral swinging movement of the seat, as represented in the dotted circles, for the purpose of giving it position to better accommodate an operator required to operate the seeding mechanism by means of the hand-lever G when the machine is used to plant the seed in check-rows, in which instance the angle-lever is disconnected from the connecting-bar of the seed-slides by turning it rearward to rest on the axle-tree.

At $s^6$ is represented a vertical bracket, of rod material, rising from the tongue on the runner-frame, designed to receive and support the lines of the team above the head of the check-row operator.

At $t$ are represented scrapers, pivoted to the rear extension of the hounds in a manner capable of a lateral swinging movement, to engage the periphery of the carrying-wheels, to scrape the adhering earth therefrom as the wheels revolve. These scrapers are made interchangeable and capable of use on either side of the machine, by which arrangement, when the first edge employed becomes worn and useless as a scraper, they may be changed to the opposite sides of the machine and their unworn edges brought into action.

At $t'$ are represented levers which are connected with the heel ends of the scrapers, from which point they extend forward, inclining toward the center of the machine, with their forward ends resting on the axle-tree in position to be operated by the feet of the driver, to hold the scrapers in contact with the wheels or disengage them therefrom.

At $u$ is represented a tool-box fixed centrally to the forward side of the axle-tree. The marker, as represented in the drawings, is substantially the same as markers heretofore in use on this class of machines, and in use the end portion of its beam $u'$ is detachably pivoted on a stud, $u''$, rising from the projecting end portion of the axle-tree, from which it extends laterally, and its outer portion is connected to the forward portion of the machine or to the eveners by means of a guy-rope, $u'''$, as usually employed for the purpose.

In the use of my improved planting-machine the seed is placed in the seed-box in the usual manner, and if employed as a check-row machine the angle-lever is disconnected from the notched bracket on the bar connecting the seed-slides. The seed contained in the seed-boxes is then distributed at the proper time by an operator through the medium of the hand-lever, by which the slides are operated in the usual manner. By connecting the free end of the angle-lever with the notched bracket on the bar connecting the seed-slides the machine will be fitted to deposit the seed automatically in hills or in drills in rows in one direction, in which instance the seat of the check-rower and the hand-lever may be removed from the machine.

I claim as my invention—

1. The combination, with a seed-slide provided with removable seed-cells, of a plate to support the seed on the removal of the seed-slide, for the purpose hereinbefore set forth.

2. A seed-supporting plate adapted to enter the seed-box on substantially the same plane of the seed-slide, to support the seed contained in the seed-box on the removal of the seed-slide, for the purpose hereinbefore set forth.

3. The combination, with a seed-slide provided with removable seed-cells, of a seed-supporting plate fitted to engage the seed-slide in a manner to be drawn into the seed-box on substantially the same plane of the seed-slide on the withdrawal of the seed-slide from the seed-box, for the purpose hereinbefore set forth.

4. The combination, with the bottom of the seed-box, provided with a vertical tube slotted in the lengthwise direction of its axis, of a two-part gravity cut-off, the respective parts being capable of an independent vertical movement in the tube, substantially as and for the purpose hereinbefore set forth.

5. The combination, with the bottom of the seed-box, provided with a vertical tube slotted in the lengthwise direction of its axis and in the direction of the movement of the seed-slide, of a two-part gravity cut-off, the respective parts having a flange to enter the vertical slots in the tube, and capable of independent vertical movements in the tube, substantially as and for the purpose hereinbefore set forth.

6. The combination, with the seed-slide provided with seed-cells, and a bottom of a seed-box provided with a vertical tube slotted in the lengthwise direction of its axis and in the direction of the movement of the seed-slide, of a two-part gravity cut-off, the respective parts thereof having a flange to enter the vertical slots in the tube, their lower ends resting on the seed-slide, and the parts capable of independent vertical movements in the tube, substantially as and for the purpose hereinbefore set forth.

7. The herein-described two-part gravity cut-off, consisting of like halves capable of limited independent relative movement endwise, substantially as and for the purpose hereinbefore set forth.

8. The combination, with the vertical tube of the seed-box and with the two-part gravity cut-off, of a transverse pin to limit the vertical movement of the two-part gravity cut-off, substantially as and for the purpose hereinbefore set forth.

9. The combination, with the bar connecting the main seed-slides, of a lever pivoted to said bar and adapted to engage a notch in the inner end of the supplemental seed-slide, as and for the purpose set forth.

10. The combination, with the bar connecting the main seed-slides, of a lever connected to said bar to operate the slides and a lever pivoted at one end on said bar, while its opposite end is adapted to engage a slot in the supplemental seed-slide, whereby the latter is caused to move in unison with the main seed-slides, substantially as set forth.

11. The combination, with the carrying-wheel, of a vibrating lever mounted on a crank-shaft, the latter having a sprocket-wheel and chain-belt connection with said carrying-wheel, substantially as set forth.

12. The combination, with the vibrating lever, of a bracket-arm arranged beneath said lever and adapted to raise said lever out of engagement with the connecting-bar of the seed-slides, substantially as set forth.

JAMES HERVA JONES.

Witnesses:
S. G. BRONSEN,
A. O. BEHEL.